July 1, 1924.

J. F. WIESNER

MEASURING AND CUTTING MACHINE

Filed Jan. 24, 1923

J. F. Wiesner
INVENTOR

BY Victor J. Evans
ATTORNEY

WITNESS:
Paul M. Hunt
P. C. Gannow.

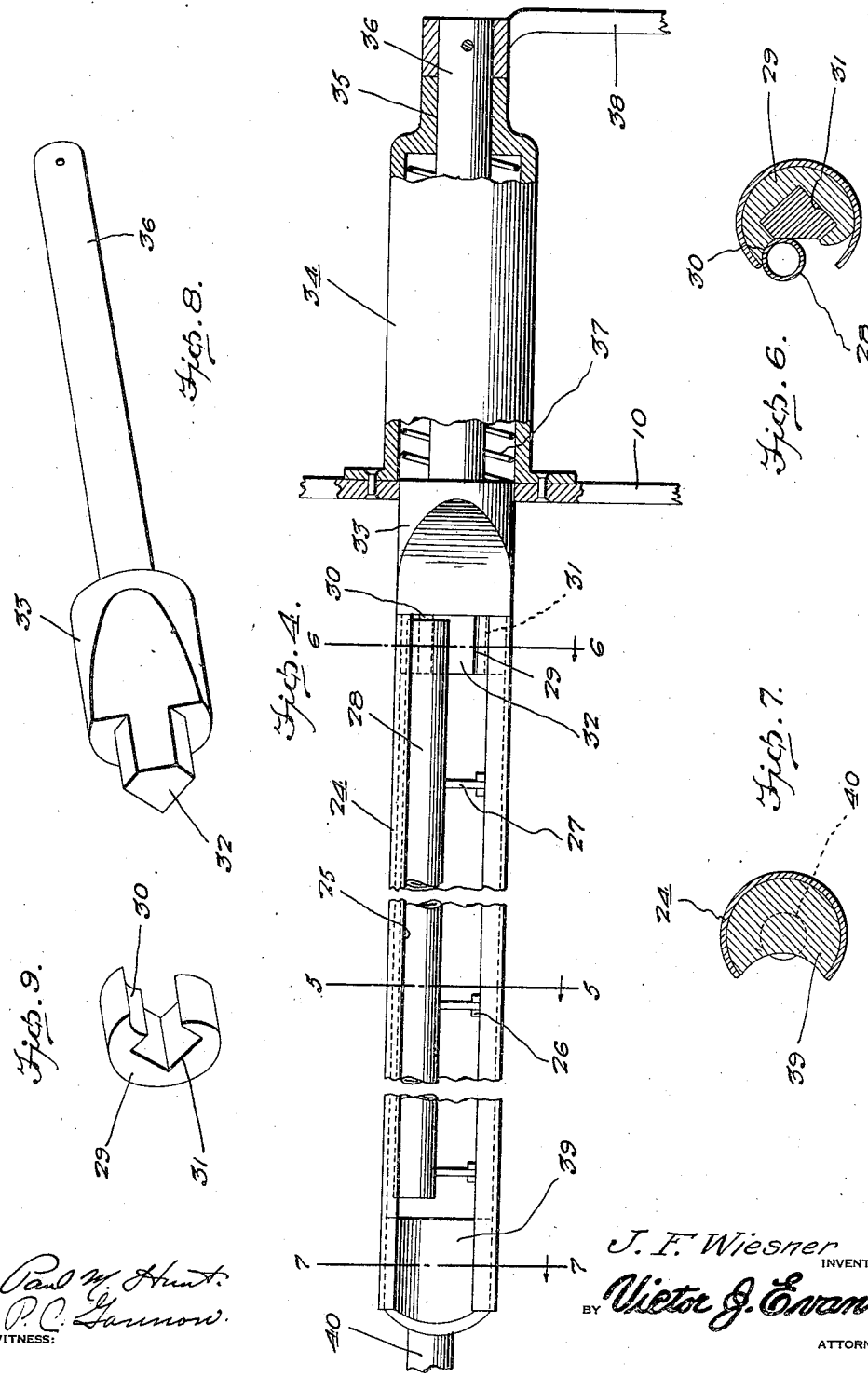

July 1, 1924.
J. F. WIESNER
1,500,019
MEASURING AND CUTTING MACHINE
Filed Jan. 24, 1923   5 Sheets-Sheet 4
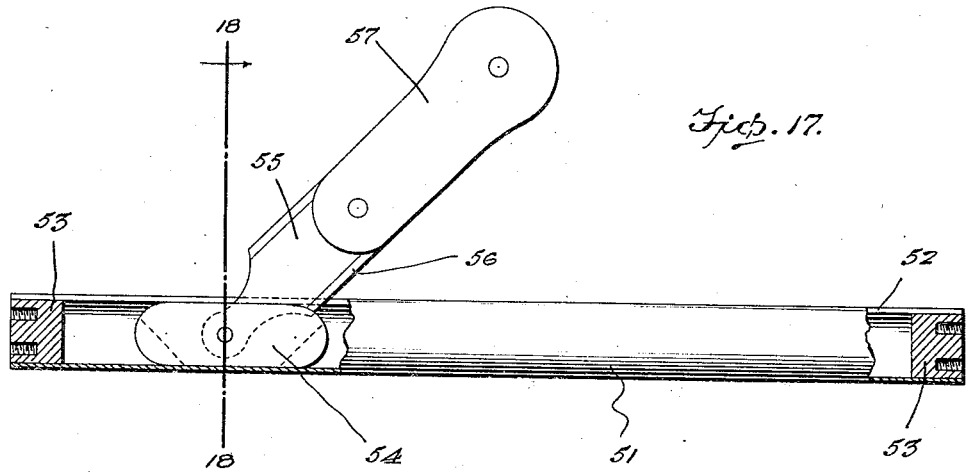
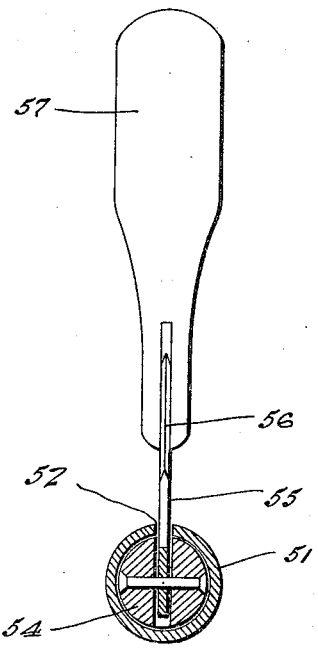
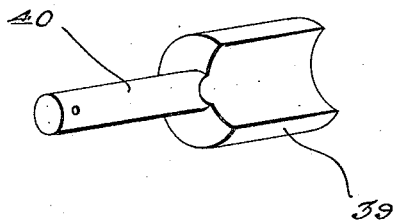
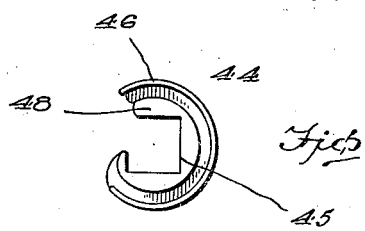
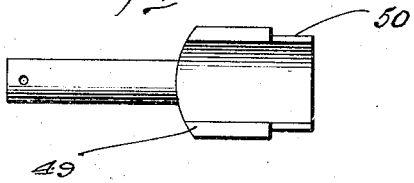
J. F. Wiesner INVENTOR
BY Victor J. Evans ATTORNEY
WITNESS:

July 1, 1924.
J. F. WIESNER
1,500,019
MEASURING AND CUTTING MACHINE
Filed Jan. 24, 1923    5 Sheets-Sheet 5
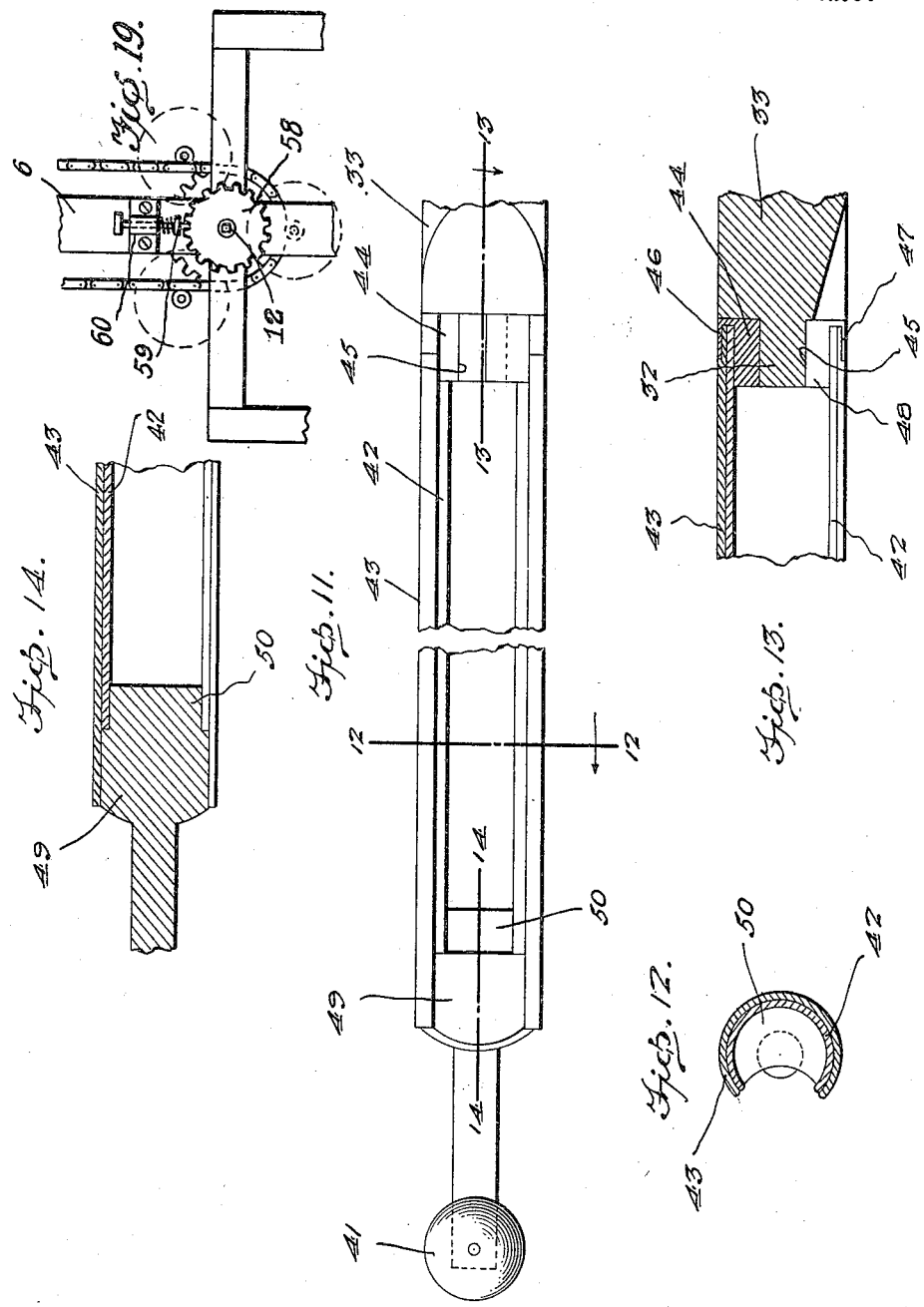
J. F. Wiesner INVENTOR

Patented July 1, 1924.

1,500,019

UNITED STATES PATENT OFFICE.

JOSEPH F. WIESNER, OF ELLIS, KANSAS.

MEASURING AND CUTTING MACHINE.

Application filed January 24, 1923. Serial No. 614,653.

*To all whom it may concern:*

Be it known that I, JOSEPH F. WIESNER, a citizen of the United States, residing at Ellis, in the county of Ellis and State of Kansas, have invented new and useful Improvements in Measuring and Cutting Machines, of which the following is a specification.

This invention relates to improvements in machines for handling oil cloth, or other roll fabric and is an improvement upon a co-pending application filed by me August 13, 1921, and bearing the Serial No. 492,169.

An object of the present invention is to improve the construction of the roll upon which the measured cloth is wound during the measuring and cutting operations, whereby the cloth may be easily and quickly secured for winding and easily and quickly removed thereafter.

Another object of the invention is the provision of improved cutting means, whereby the cloth may be quickly and cleanly severed without damage to the contiguous portions thereof.

Another object of the invention is the provision of a novel arrangement and disposition of the various parts, whereby the rolls of fabric may be plainly seen and any one of said rolls easily and quickly brought into position adjacent the cutting mechanism.

With the above and other objects in view, the invention further includes the following novel features and details of construction, to be hereinafter more fully described, illustrated in the accompanying drawings and pointed out in the appended claims.

In the drawings:—

Figure 4 is an enlarged elevation of the winding roll, the figure showing in section the portions of the machine frame within which this roll is mounted.

Figure 6 is a section on the line 6—6 of Figure 4.

Figure 7 is a similar view on the line 7—7 of Figure 4.

Figure 8 is a detail perspective view of the roll driving and coupling member.

Figure 9 is a similar view of the insert which receives the member shown in Figure 8.

Figure 10 is a like view of the supporting member for the opposite end of the winding roll.

Figure 11 is a view similar to Figure 4 showing a modified form of winding roll.

Figure 12 is a section on the line 12—12 of Figure 11.

Figure 13 is a fragmentary section taken on the line 13—13 of Figure 11.

Figure 14 is a similar view on the line 14—14 of Figure 11.

Figure 15 is a detail view of the insert at the driving end of the winding roll.

Figure 16 is a view of the supporting member for the opposite end of the roll.

Figure 17 is an elevation partly broken away showing the cutting bar and its supporting means.

Figure 18 is an enlarged sectional view on the line 18—18 of Figure 17.

Figure 19 is a fragmentary view showing the manner of holding the display rollers in position.

Referring in detail to the drawings, like characters of reference denote corresponding parts throughout the several views.

Figure 1:
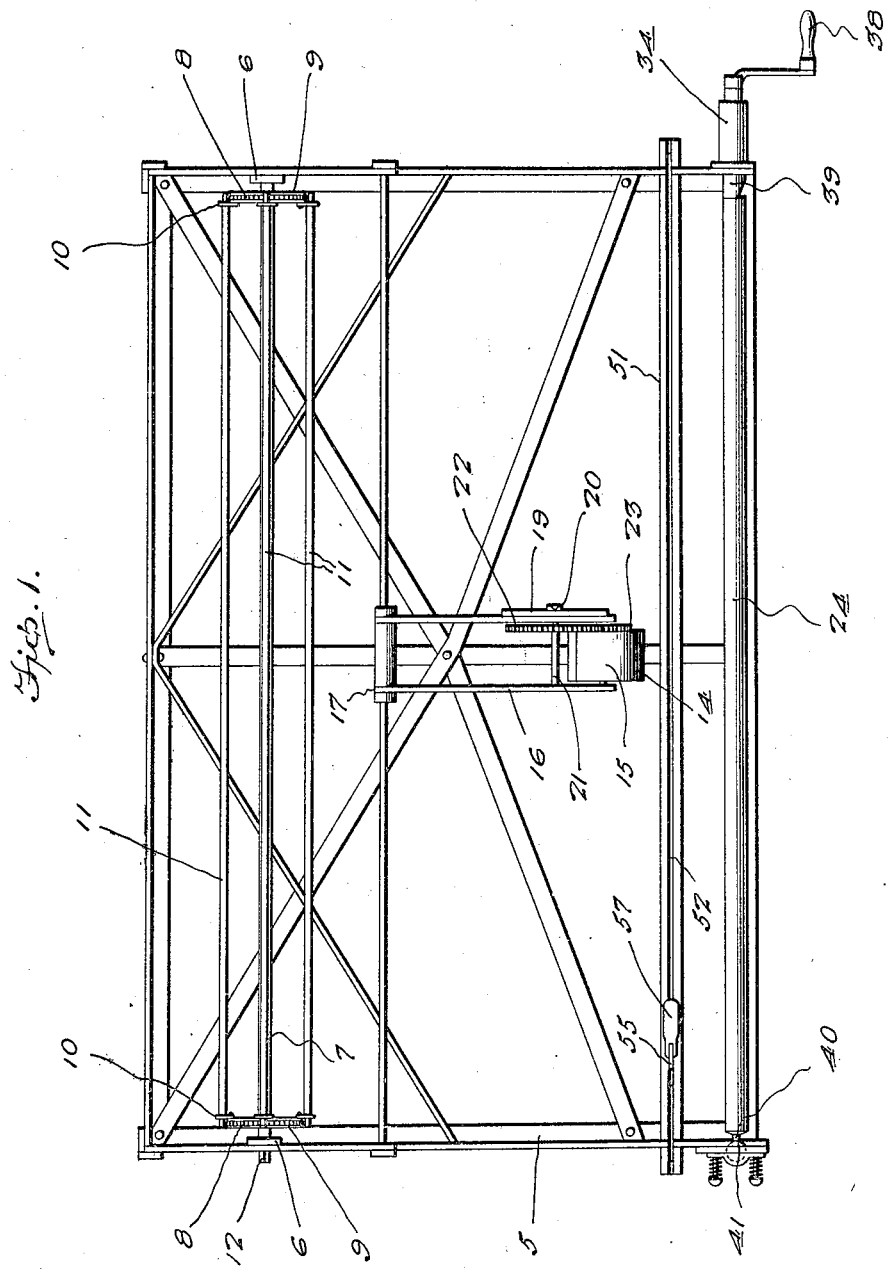
Figure 1 is a top plan view of a machine constructed in accordance with the invention.
Figure 2:
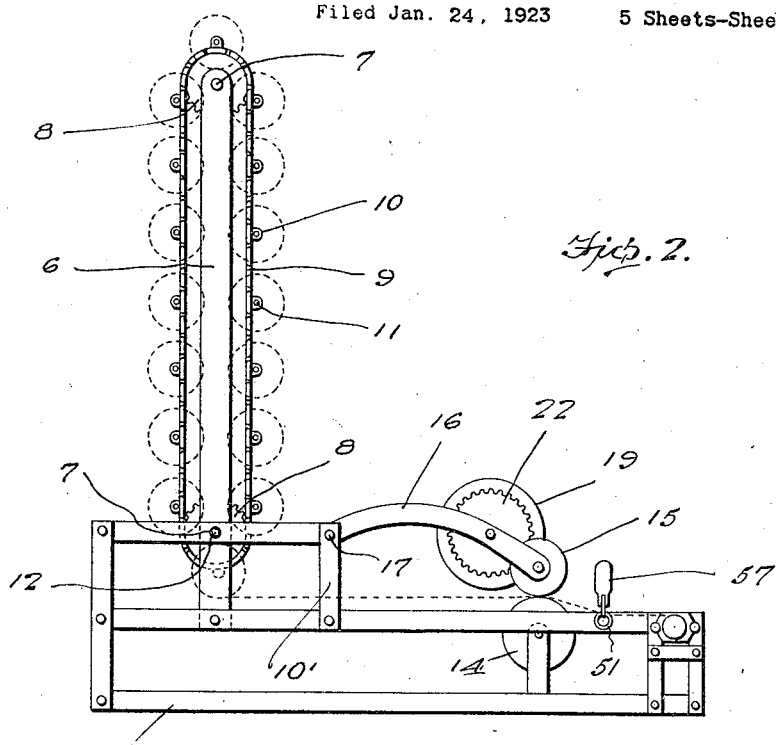
Figure 2 is a side view of the same.
Figure 3:
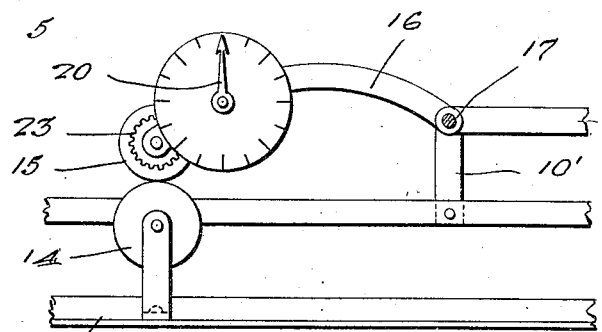
Figure 3 is a fragmentary elevation looking at the opposite side of the machine from that shown in Figure 2.

The invention, which as before stated, is an improvement upon my co-pending application above mentioned, includes a horizontally arranged frame 5, which supports at one end thereof vertically disposed standards 6, the said standards providing bearings for transversely arranged shafts 7, which carry sprocket wheels 8, disposed adjacent each of the standards 6. Traveling over these sprocket wheels is a chain 9, whose links include bearing links 10, the latter providing bearings for rollers 11, which are adapted to have rolled thereon oil-cloth or other fabric, so that the same may be conveniently and attractively displayed. The cloth or fabric will thus be displayed upon opposite sides of the standards 6 and the chain 9 may be moved through the rotation of the sprocket wheels 8 to bring any of said rolls into juxtaposition to a cutting mechanism which is carried by the horizontal frame 5 and which will be hereinafter described. In order to rotate the sprocket wheels 8, one of the shafts 7 is provided with a rectangular extension 12, to which may be attached a suitable operating handle (not shown).

The horizontal frame 5 supports a roller 14, which co-operates with a roller 15 whose opposite ends are supported by a frame 16, the latter being pivotally secured to the frame 10' as shown at 17. The roller 11 from which a length of cloth or fabric is to be cut, is brought into lowered position and the cloth from this roll is passed between the rollers 14 and 15, the latter being elevated for this purpose so as to permit the free end of the cloth to be secured to a winding roll, whose construction will be hereinafter explained. The frame 16 carries a measuring dial 19, with which co-operates a pointer 20. This pointer is secured upon a rotatably mounted shaft 21, which also carries a gear 22, the latter engaging a pinion 23 which rotates simultaneously with the roller 15. Thus, as the cloth is pulled between the rollers 14 and 15, the pointer 20 will move over the face of the dial 19 so as to measure the cloth after the manner described in my said co-pending application.

Figure 5:
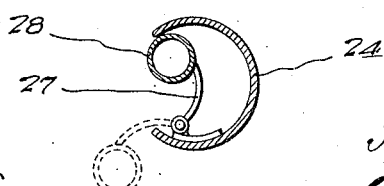
Figure 5 is a section on the line 5—5 of Figure 4, the cloth clamping device being shown in active or clamping position by full lines and in its opposite inactive position by dotted lines.

The winding roll which is shown in detail in Figures 4 to 7 of the drawings, is indicated at 24 and consists of a pipe or tube which is cut away for substantially one-third of its circumference so as to provide a longitudinally disposed slot 25, Figure 4 which extends throughout the length of the tube. Pivotally mounted within the tube 24 as shown at 26, are spaced arms 27. These arms carry at their free ends a hollow clamping rod 28, the parts being so proportioned that when the rod 28 is in the position shown by the full lines in Figure 5, it will clamp the free end of the cloth against the inner periphery of the tube 24. To do this, the rod is swung outward to the dotted line position shown in said figure and the cloth is inserted within the upper edge of the slot 25. The rod 28 may then move upward so as to bite against the edge of the tube to clamp the cloth therein. After the desired length of cloth has been wound upon the roll 24 and has been cut in a manner to be later explained, the rod 28 may be moved pivotally as is also shown by the dotted lines in Figure 5, whereupon the cloth will be released.

In order to hold the winding roll in position upon the machine frame, one end, which may be termed the driving end of the roll, is provided with an insert 29 Figures 6 and 9. This insert is in the form of a mutilated disk having a seat 30 for engagement by the rod 28, so that when the latter is moved inward to engage the cloth, its inward movement will be limited and release of the cloth will be prevented until the insert is removed from the edge of the roll 24. This insert is provided with a substantially rectangular opening 31, which is adapted to receive a similarly formed lug 32 which extends from one end of a driver or coupling 33. This driver is movable longitudinally within a sleeve 34 Figure 4, which extends from the frame 10 and which is provided with an opening 35 for the passage of a reduced stem 36, which is carried by the driver. This stem has a bearing in the opening 35 and is surrounded within the sleeve 34 by a coiled spring 37 which acts to normally force the lug 32 into the opening 31 of the insert 29. This lug however, may be easily removed by moving the driver longitudinally, so that the roll 24 may be uncoupled from the frame, the insert 29 removed and the rod 28 forced inward for the release of the cloth, as previously explained. The reduced stem 36 of the driver 33 has secured to its outer end an operating handle 38, by means of which the winding roll may be rotated. This handle also serves to limit the inward movement of the driver 33.

The opposite end of the winding roll receives a bearing member 39, Figures 7 and 10 which is provided with a stem 40 for connection with the spherical member or ball 41 of my co-pending application, so that the winding roll may be swung to a convenient position for the removal of the cloth.

In Figures 11 to 14 inclusive, there is illustrated a modified form of winding roll. This winding roll comprises inner and outer pipe sections 42 and 43, which are slotted throughout their lengths in a manner similar to the winding roller 24. The inner pipe section 42 has a rotating fit within the pipe section 43 and one edge of the inner section is adapted to co-operate with one edge of the outer section to clamp the free edge of the cloth to the roll. The driving end of this form of winding roll is provided with an insert 44, Figure 15 which has a substantially rectangular opening 45 for the reception of the rectangular lug 32 of the driver 33. This insert 44 is provided with a flange 46 which fits over a reduced end 47 of the outer pipe section 43. A concentrically arranged slotted sleeve 48 Figures 13 and 15 fits within the inner periphery of the pipe section 42.

The opposite end of the roll shown in Figures 11 to 14 receives a bearing member 49 which fits within the end of the outer pipe section 43 and which is provided with a reduced extremity 50 extending within the adjacent end of the inner pipe section 42. A shoulder is thus provided against which the end of the inner pipe section abuts. The bearing member 49 is connected in the same manner as in the form of winding roll previously described.

When it is desired to release the cloth from the last described form of winding roll, the operating handle is rotated in a direction reverse to the direction of winding, a sufficient holding pressure being exerted upon the outer pipe section 43 to prevent rotation of this section.

In Figures 17 and 18 there is illustrated a cutting mechanism which comprises a tubular cutting bar 51 having each of its ends supported in the machine frame. This bar is longitudinally slotted as shown at 52 and each end of the slot is closed by a plug 53 which is inserted in the ends of the bar. A guide block 54 is arranged within and movable longitudinally of the bar and pivotally secured to this block is a knife 55, having opposite cutting edges 56 and a handle 57. This knife may be swung upon its pivot so as to bring either of the cutting edges into position for use, whereupon it may be moved longitudinally of the bar 51 to cut the cloth which is positioned over the bar. The blocks 53 at each end of the bar 51 provide stops for the knife and are of a material to prevent injury to the cutting edges 56.

In order to hold the display rollers in position, the shaft 12 has secured thereon a toothed wheel 58 which is engaged by a spring actuated dog 59 which is carried by a bracket 60 secured to one of the standards 6. This will hold the device in adjusted position should the weight of the rolled material upon one side of the standards be greater than the weight of the rolls upon the opposite side and will maintain a roll in proper position during the cutting operation.

The invention is susceptible of various changes in its form, proportions and minor details of construction and the right is herein reserved to make such changes as properly fall within the scope of the appended claims.

Having described the invention what is claimed is:—

1. In a machine of the class described, a supporting frame, bearings for supporting the roll of fabric, a cutting mechanism, a hollow slotted winding roll rotatably mounted in said frame, means operable within the hollow winding roll for clamping engagement with the fabric, a spring pressed combined driving and coupling member, means whereby the coupling member may be rotated, an insert member engaged within the end of the winding roll and having a substantially rectangular opening therein, a longitudinally movable combined driving and coupling member detachably mounted upon the frame, means located at one end of said member for removable engagement within the opening of the insert member and means located at the opposite end of the coupling member whereby the latter may be rotated.

2. In a machine of the class described, a supporting frame, bearings for supporting the roll of fabric, a cutting mechanism, a hollow slotted winding roll rotatably mounted in said frame, a clamping bar mounted within the winding roll for clamping the fabric against the inner periphery of the roll, means for mounting the clamping bar whereby the latter is capable of movement upon opposite sides of the clamping position, means for limiting the movement of the clamping bar in one direction and means for rotatably mounting the winding roll upon the frame.

3. In a machine of the class described, a supporting frame, bearings for supporting the roll of fabric, a cutting mechanism, a hollow slotted winding roll rotatably mounted in said frame, a clamping bar mounted within the winding roll for clamping the fabric against the inner periphery of the roll, means for mounting the clamping bar whereby the latter is capable of movement upon opposite sides of the clamping position, means for detachably and rotatably mounting the winding roll upon the frame and means included in the winding roll mounting means for limiting the movement of the clamping bar in one direction.

4. In a machine of the class described, a supporting frame, bearings for supporting the roll of fabric, a cutting mechanism, a hollow slotted winding roll rotatably mounted in said frame, a clamping bar mounted within the winding roll for clamping the fabric against the inner periphery of the roll, means for mounting the clamping bar whereby the latter is capable of movement upon opposite sides of the clamping position, means for detachably and rotatably mounting the winding roll upon the frame and means included in the winding roll mounting means and operable when the roll is mounted for limiting the movement of the clamping rod in one direction.

In testimony whereof I affix my signature.

JOSEPH F. WIESNER.